United States Patent [19]

Levresse et al.

[11] 4,168,356

[45] Sep. 18, 1979

[54] PROCESS FOR POLYMERIZING ETHYLENE

[75] Inventors: Bernard Levresse; Robert Fonmartin, both of Lillebonne, France

[73] Assignee: Societe Chimique des Charbonnages-CdF Chimie, Bully-les-Mines Mazingarbe, France

[21] Appl. No.: 891,216

[22] Filed: Mar. 29, 1978

[30] Foreign Application Priority Data

Mar. 31, 1977 [FR] France .................. 77 09774

[51] Int. Cl.$^2$ .................. C08F 6/04; C08F 6/28; C08F 10/02
[52] U.S. Cl. .................. 526/64; 422/133; 526/65; 526/68; 526/73; 526/84; 526/352.2; 528/498
[58] Field of Search .................. 526/64, 65, 68, 73, 526/84, 352.2; 528/498; 23/288

[56] References Cited

U.S. PATENT DOCUMENTS

| | | | |
|---|---|---|---|
| 3,099,648 | 7/1963 | Dye | 526/84 |
| 3,184,444 | 5/1965 | Eilbracht et al. | 526/68 |
| 3,306,889 | 2/1967 | Schappert | 526/68 |
| 3,551,397 | 12/1970 | Rätzsch et al. | 526/68 |
| 3,628,918 | 12/1971 | Beals et al. | 526/88 |
| 3,708,465 | 1/1973 | Dietrich et al. | 526/84 |
| 3,784,538 | 1/1974 | Pfannmueller et al. | 526/64 |
| 4,014,859 | 3/1977 | Cooper et al. | 526/65 |
| 4,105,842 | 8/1978 | Nicco et al. | 526/65 |

FOREIGN PATENT DOCUMENTS 2313399 12/1976 France .
1332859 10/1973 United Kingdom .................. 526/65

*Primary Examiner*—Alan Holler
*Attorney, Agent, or Firm*—Finnegan, Henderson, Farabow & Garrett

[57] ABSTRACT

A process and apparatus for the polymerization of ethylene in at least one multizone reactor at a pressure of 300 to 2500 bars and at a temperature of 150 to 350° C. The reaction mixture is passed from the reactor to a separator at a pressure of 50 to 500 bars in which the polymer separates from the gas. The polymer is then passed to a hopper at a pressure of 1 to 20 bars in which the major part of the gas remaining dissolved in the polymer is removed. The gas from the separator is recompressed and is returned only to the first zone of the reactor.

24 Claims, 2 Drawing Figures

PROCESS FOR POLYMERIZING ETHYLENE

BACKGROUND OF THE INVENTION

This invention relates to the polymerization of ethylene at high pressures.

It is well known that polymerization or copolymerization of ethylene can be effected at high pressure in the presence of either a free-radical yielding catalyst or a catalyst comprising a transition metal compound. In a typical continuous high pressure process, the reactant mixture in the polymerization reactor is under supercritical conditions and is passed to a separator at lower pressure in which the polymer separates from a large proportions of the gas. The polymer is then passed to a hopper at a lower pressure than the separator. The major part of the gas which remains dissolved in the polymer is removed in the hopper and the polymer is then passed to an extruder. The gas removed from the polymer in the hopper is recompressed, mixed with the gas from the separator, make-up ethylene (and comonomer) as required, compressed further and returned to the polymerization reactor. If polymerization is effected in a multizone reactor, a proportion of the feed gas may be introduced into each zone.

U.S. Pat. No. 4,014,859 describes a process for the polymerization of ethylene in at least two reaction zones comprising the particular feature of passing the gas from the separator to at least one zone other than the first zone of the polymerization reactor. It may be observed however that the process results in polymer deposits in the first zone of the reactor, which do not permit the necessary maintenance of a single phase in the first zone.

SUMMARY OF THE INVENTION

An object of the invention is therefore to perform a polymerization process in which a single phase can be easily maintained in every zone of the reactor, and to improve the properties of the polymers obtained by the previously known methods. In the case of catalysis by means of a transition metal compound, it is a further object for some applications to increase the polydispersity index of the polymer, defined as the ratio (Mw/Mn) of the weight-average molecular weight to the number-average molecular weight.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the invention comprises a process for polymerizing or copolymerizing ethylene in the presence of a catalyst in at least one reactor comprising two or more reaction zones, at a pressure of 300 to 2,500 bars and at a temperature of 150° C. to 350° C., wherein the reaction mixture is passed from the reactor into a separator at a pressure of 50 to 500 bars in which the polymer separates from the gas, the polymer is then passed to a hopper at a pressure of 1 to 20 bars in which the major part of the gas remaining dissolved in the polymer is removed, and the gas from the separator is recompressed and is returned only to the first zone of the reactor.

In a preferred embodiment of the invention, the fresh gas supplied to the reactor is passed only to the zones subsequent to the first zone of the reactor, i.e. to the second and following zones of the reactor. In another preferred embodiment the gas removed from the polymer in the hopper is recompressed and then mixed with the gas from the separator or with the fresh gas supplied to the reactor. The gas from the hopper may be mixed with fresh gas before recompression. Another preferred embodiment of the invention is to inject gas between the reactor and the separator at a pressure below that of the separator, according to French Pat. No. 2,313,399. In this case the gas injected comes either from the fresh gas supplied to the reactor or from the re-cycled gas from the separator. When a catalyst comprising a transition metal compound is used, the process of the invention may be improved by providing termination of the polymerization by injecting into the reaction mixture an alkali metal salt or alkaline earth metal salt of carboxylic acid which upon reaction with the catalyst will form reaction products that remain in the polymer, according to French Pat. No. 2,302,305.

Another preferred embodiment of the invention includes carrying out the polymerization in two reactors arranged in parallel, each of them comprising two or more zones, passing the mixtures from the two reactors into the same separator, recompressing the gas from the separator, and returning it only to the first zone of one or both of the reactors. There are two particularly preferred embodiments in this case. According to the first embodiment all of the gas from the separator is passed to the first zone of the first reactor, while the supply of fresh gas is passed only to the first zone of the second reactor. According to the second embodiment, part of the recompressed gas from the separator is passed to the first zone of the first reactor and the rest is passed to the first zone of the second reactor, the supply of fresh gas being passed only to the second zone of the second reactor. An advantage of this particular embodiment employing two reactors in parallel is that the two reactors may operate at different pressures.

The present invention may be applied to the copolymerization of ethylene with α-olefins such as propylene, but-1-ene, and hex-1-ene. When a free-radical yielding catalyst is used, the invention can be applied to the copolymerization of ethylene with polar comonomers such as carbon monoxide, maleic anhydride, and vinyl esters. When a catalyst comprising a transition metal compound is used, the invention can be applied to the terpolymerization of ethylene with an α-olefin such as propene and with a non-conjugated diolefin.

As previously known, chain transfer agents, such as for example hydrogen, may be used to regulate and control the characteristics of the polymer. In this case of course, the transfer agent content will be different in the fresh gas feed on the one hand and in the re-cycled gas feed on the other hand, owing to the volatility of hydrogen, which dissolves only slightly in the polymer. The reaction mixture may also comprise an inert diluent. When the catalyst comprises a transition metal compound, the diluent may be a hydrocarbon, such as propane or butane, at the rate of 1 to 20% by weight with respect to the gaseous mixture.

Thus, in accordance with the invention, the term "gas" is intended to mean the stream of ethylene optionally comprising comonomer and/or chain transfer agent and/or inert diluent. The term "free-radical yielding catalyst" is intended to mean oxygen, peroxides, and peresters. The term "catalysts comprising a transition metal compound" is intended to mean a catalytic system comprising (a) an activator such as trialkylaluminum, a halogenodialkylaluminum, or an alkylsiloxalane and (b) an optionally supported halogen compound of a transition metal of groups IVA to VIA. Amongst the latter may be mentioned $\pi$-allyl complexes or benzyl complexes of chromium, zirconium, and titanium, as well as titanium trichloride optionally syncrystallized with aluminum chloride and optionally supported on anhydrous magnesium chloride. The catalysts are preferably used dissolved or dispersed in an inert diluent. They may be injected into the various zones of the reactors.

The process of the invention is carried out continuously either in a stirred autoclave reactor or in a tubular reactor. This latter type of reactor is in fact constituted by successive zones defined by the feed points of monomer and catalyst, as described for example in East German Pat. No. 58.387. The invention also relates to an apparatus for carrying out the polymerization of ethylene, comprising at least one reactor having two or more zones, a separator connected to the reactor by a pipe, a low pressure hopper connected to the separator by a pipe, a booster compressor and a first high pressure compressor, a high pressure connecting pipe extending from the first compressor to at least one zone different from the first zone of the reactor, a first (intermediate pressure) gas transfer pipe extending from the separator to a second high pressure compressor and another high pressure connecting pipe extending from the second compressor to the first zone of the reactor, a second (low pressure) gas transfer pipe extending from the hopper to the booster compressor, and a connecting pipe extending from the latter to join either the fresh ethylene feed pipe or the first gas transfer pipe. Of course, the two high pressure compressors may be different cylinders of a compressor comprising several cylinders.

The apparatus may also comprise one or more feed pipes for comonomer, inert diluent and/or chain transfer agent. When such feed pipes are provided, they are preferably arranged in order to introduce the comonomer and/or the inert diluent into the fresh ethylene feed pipe, while the chain transfer agent feed pipe is preferably connected to the gas transfer pipes. The apparatus may further comprise a gas injector, for example of the type described in French Pat. No. 2 313 399, provided on the pipe connecting the reactor to the separator as well as an (intermediate pressure) gas transfer pipe extending from the injector to either the stream of fresh ethylene or, through a valve, the first gas transfer pipe.

The invention consists in the novel parts, constructions, arrangements, combinations and improvements shown and described. The accompanying drawings, which are incorporated in and constitute a part of this specification, illustrate two embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 1:
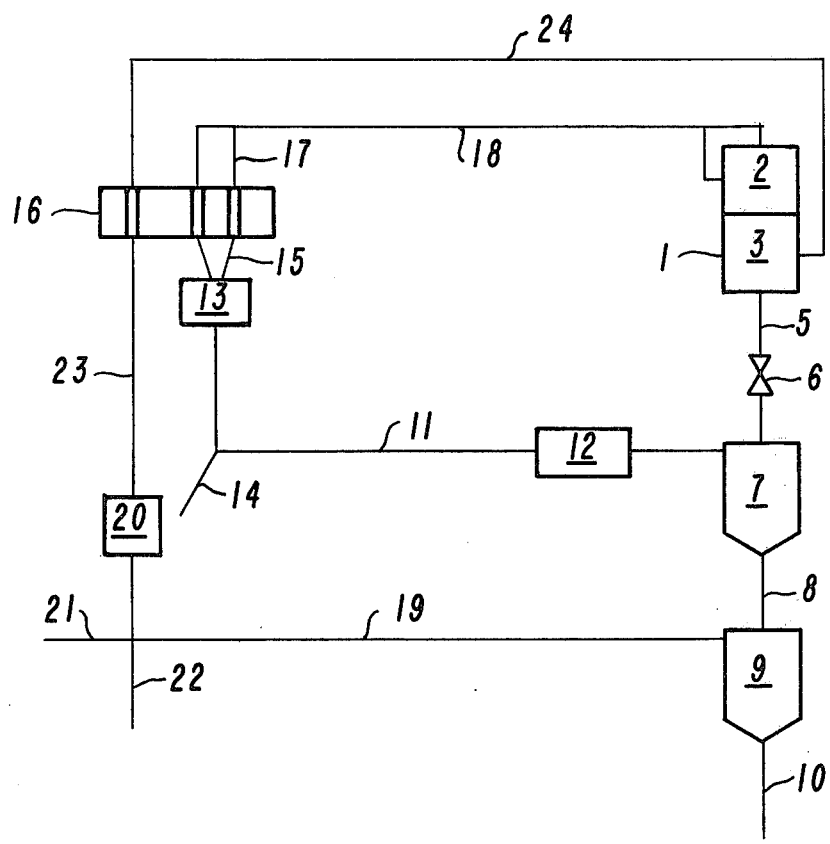
FIG. 1 illustrates an apparatus comprising a two zone reactor.

In FIG. 1, a stirred autoclave reactor is divided internally into two zones 2 and 3. From zone 3, a polymer withdrawal pipe 5 leads, through a valve 6, to a separator 7. From the latter, a pipe 8 leads to a low pressure hopper 9, from which a polymer transfer pipe 10 leads to an extruder (not shown). From the separator 7, a first gas transfer pipe 11 leads through a cooler 12 to a mixing vessel 13. The vessel 13 also receives a chain transfer agent feed pipe 14 connected to a supply of the agent (not shown).

From the vessel 13, several connecting pipes 15 lead to a corresponding number of cylinders of a high pressure compressor 16. From the outlets of these cylinders, high pressure connecting pipes 17 merge to form a high pressure connecting pipe 18 to zone 2 of the reactor at one or more points. From the hopper 9, a low pressure gas transfer pipe 19 leads to a booster compressor 20. An ethylene pipe 21 and comonomer or diluent pipes 22 coming respectively from supplies of fresh ethylene and comonomer or diluent (not shown) are connected to the pipe 19. From the compressor 20, a connecting pipe 23 leads to the last cylinder of the compressor 16. From this cylinder, a high pressure connecting pipe 24 leads to zone 3 of the reactor.

Figure 2:
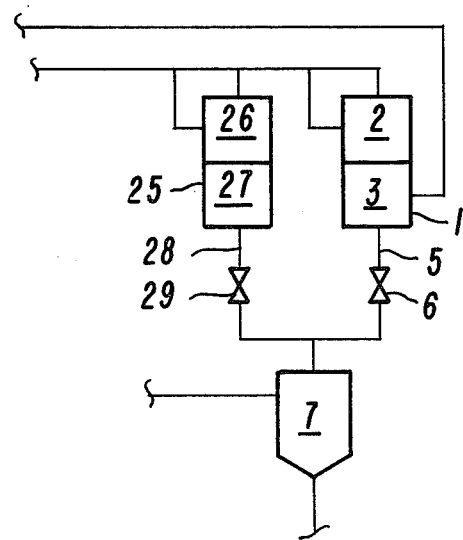
FIG. 2 illustrates an apparatus comprising two two-zone reactors arranged in parallel.

In FIG. 2, corresponding parts of the apparatus are designated by the same reference numerals as in FIG. 1. There is shown a second stirred autoclave reactor 25 divided internally into two zones 26 and 27. From zone 27, a polymer withdrawal pipe 28 leads through a valve 29 to separator 7. As in the embodiment of FIG. 1, high pressure connecting pipe 24 leads only to zone 3 of reactor 1. On the other hand, high pressure connecting pipe 18 is connected to both zone 2 of reactor 1 and zone 26 of reactor 25 at one or more points. As previously mentioned, the pressures in reactors 1 and 25 may be maintained at different values and controlled by adjusting valves 6 and 29.

The following examples serve merely to illustrate the invention and are not intended to limit the invention.

EXAMPLES 1 and 2

Ethylene is polymerized at a pressure of 1200 bars and a temperature of 250° C., in the presence of propane used as a diluent at the rate of 8% by volume with respect to the gaseous mixture, in a stirred autoclave reactor comprising two zones. Hydrogen is used as the transfer agent in a mean proportion by volume h which is adapted in order to obtain polymers having approximately equal melt index.

In Example 1, the polymerization apparatus used is that shown in FIG. 1 and previously described. In Example 2, the polymerization apparatus used is in accordance with U.S. Pat. No. 4,014,859; i.e.—using the reference numerals of FIG. 1—with respect to the former, it shows the two following modifications: the high pressure connecting pipe 18 leads to zone 3, whereas the high pressure connecting pipe 24 leads to zone 2.

The catalytic system used is a violet titanium trichloride $TiCl_3$, $\frac{1}{3}AlCl_3$ pre-activated by trioctylaluminum in order to achieve an atomic ratio (Al/Ti)=1, in suspension in methyl cyclohexane, prepolymerized in hex1-ene in a molar ratio hexene/Ti between 3 and 5 and, finally, activated by trioctylaluminum to give a final atomic ratio (Al/Ti)=3. The catalytic suspension is injected into zone 3.

The characteristic properties of the polymers produced are given in Table I below. The melt-index M.I. is measured in dg/10 min according to ASTM standard 1238-62 T. The density of polyethylene $\rho$ is expressed in g/cm³ and measured at 20° C. on samples re-heated for 1 hour at 150° C., then cooled at a speed of 50° C./hour. The elongation at break EB (%) and the breaking strength BS in kg/cm² are measured according to the ISO R 527 standard. The polydispersity index $M_w/M_n$ is measured by means of gel permeation chromatography.

TABLE I

| Example | h % | M.I. | $\rho$ | BS | $M_w/M_n$ | EB |
|---|---|---|---|---|---|---|
| 1 | 0.45 | 2.3 | 0.946 | 135 | 18.8 | 405 |
| 2 | 0.8 | 2.9 | 0.949 | 115 | 12.1 | 235 |

EXAMPLES 3 and 4

Ethylene is polymerized at a pressure of 1700 bars in a stirred autoclave reactor comprising two zones and in the presence of propylene as the transfer agent in a mean proportion by volume $\pi$ which is adapted to obtain polymers having approximately equal melt-index. The first zone operates at a temperature of 190° C. and is supplied with tertio butyl perpivalate initiator; the second zone operates at a temperature of 260° C. and is supplied with tertiobutyl peroxide initiator.

In Example 3, the polymerization apparatus used is that shown in FIG. 1 and previously described. In Example 4, the polymerization apparatus used is in accordance with U.S. Pat. No. 4,014,859 as described in Example 2 above.

The characteristic properties of the polymers produced are given in Table II below: the density $\rho$ and the melt-index M.I. are measured as aforementioned; B is the percentage of molecular weights below 5,000.

TABLE II

| Example | M.I. | $\rho$ | B | $\frac{M_w}{M_n}$ | $\pi$ % |
|---|---|---|---|---|---|
| 3 | 8.4 | 0.9164 | 4.5 | 7.2 | 1.5 |
| 4 | 8.6 | 0.9154 | 6.3 | 10.2 | 1.5 |

It will be apparent to those skilled in the art that various modifications and variations could be made in the polymerization process and apparatus of the invention without departing from the scope or spirit of the invention. For example, different types of polymerization reactors may be combined within the broad concept of the invention.

What we claim is:

1. Process for the polymerization or copolymerization of ethylene in the presence of a catalyst in at least one reactor comprising two or more reaction zones, at a pressure of 300 to 2,500 bars and at a temperature of 150 to 350° C., comprising:
   (a) passing a reaction mixture comprising gas and polymer from said at least one reactor into a separator at a pressure of 50 to 500 bars;
   (b) separating said polymer from said gas in said separator;
   (c) passing said polymer from said separator to a hopper at a pressure of 1 to 20 bars;
   (d) removing the major part of the gas remaining dissolved in said polymer in said hopper;
   (e) recompressing said gas from said separator;
   (f) returning said recompressed gas only to the first zone of said at least one reactor; and
   (g) passing fresh gas supplied to said at least one reactor only to the zones subsequent to the first zone of said at least one reactor.

2. Process according to claim 1, further comprising recompressing the gas removed from the polymer in the hopper and then mixing said recompressed gas from said hopper with said gas from the separator.

3. Process according to claim 1, further comprising recompressing the gas removed from the polymer in the hopper and mixing said gas from said hopper with fresh gas supplied to said at least one reactor.

4. Process according to claim 1, further comprising injecting gas between said at least one reactor and said separator at a pressure below that of said separator.

5. Process according to claim 4, wherein said gas injected between said at least one reactor and said separator comprises fresh gas supplied to said at least one reactor.

6. Process according to claim 4, wherein said gas injected between said at least one reactor and said separator comprises said gas from said separator.

7. Process according to claim 1, wherein said at least one reactor is of the stirred autoclave type.

8. Process according to claim 1, wherein said at least one reactor is of the tubular type.

9. Process according to claim 1, wherein polymerization is carried out in two reactors arranged in parallel, each of them comprising two or more zones, said process further comprising passing reaction mixtures from said two reactors into the same separator, recompressing the gas from said separator, and returning said recompressed gas only to the first zone of at least one of said reactors.

10. Process according to claim 9, wherein part of said compressed gas from said separator is passed to the first zone of one of said reactors and the rest is passed to the first zone of the other of said reactors, the supply of fresh gas being passed only to the second zone of the other of said reactors.

11. Process according to claim 9, further comprising operating said two reactors at different pressures.

12. Process according to claim 1, wherein polymerization is carried out in the presence of at least one chain transfer agent.

13. Process according to claim 1, wherein polymerization is carried out in the presence of a free-radical yielding catalyst.

14. Process according to claim 1, wherein polymerization is carried out in the presence of a catalyst comprising a transition metal compound.

15. Process according to claim 1, wherein polymerization is carried out in the presence of an inert diluent.

16. Process according to claim 14, further comprising terminating polymerization by injecting into the reaction mixture an alkali metal salt or alkaline earth metal salt of carboxylic acid which upon reaction with the catalyst will form reaction products that remain in the polymer.

17. Apparatus for carrying out the polymerization of ethylene, comprising:
   (a) at least one reactor having two or more zones;
   (b) a separator;

(c) a pipe connecting said separator to said at least one reactor;
(d) a low pressure hopper;
(e) a pipe connecting said hopper to said separator;
(f) a booster compressor;
(g) a first high pressure compressor;
(h) a second high pressure compressor;
(i) a first (intermediate pressure) gas transfer pipe extending from said separator to the intake of said second high pressure compressor;
(j) a second (low pressure) gas transfer pipe extending from said hopper to the intake of said booster compressor;
(k) a connecting pipe extending from the outlet of said booster compressor to the intake of said first high pressure compressor;
(l) a fresh ethylene feed pipe for supplying fresh ethylene to the gas from said hopper at a point between said hopper and said first high pressure compressor;
(m) a high pressure connecting pipe extending from the outlet of said first high pressure compressor to at least one zone different from the first zone of said at least one reactor; and
(n) another high pressure connecting pipe extending from the outlet of said second high pressure compressor to the first zone of said at least one reactor.

18. Apparatus according to claim 17, further comprising a gas injector in said pipe connecting said separator to said at least one reactor for injecting gas between said at least one reactor and said separator at a pressure below that of said separator.

19. Apparatus according to claim 17 wherein said at least one reactor is of the stirred autoclave type.

20. Apparatus according to claim 17 wherein said at least one reactor is of the tubular type.

21. Apparatus according to claim 17 wherein said at least one reactor consists of two reactors each having two or more zones, further comprising:
(o) connecting pipes extending from the outlets of each of said reactors to said pipe connecting said separator to said reactors.

22. Apparatus according to claim 21, wherein said high pressure connecting pipe extending from the outlet of said first high pressure compressor extends to only one reactor and said high pressure connecting pipe extending from the outlet of said second high pressure compressor extends to both of said reactors.

23. Process for the polymerization or copolymerization of ethylene in the presence of a catalyst in two reactors arranged in parallel, each of them comprising two or more zones, at a pressure of 300 to 2,500 bars and at a temperature of 150° to 350° C., comprising:
(a) passing reaction mixtures comprising gas and polymer from said two reactors into a single separator at a pressure of 50 to 500 bars;
(b) separating said polymer from said gas in said separator;
(c) passing said polymer from said separator to a hopper at a pressure of 1 to 20 bars;
(d) removing the major part of the gas remaining dissolved in said polymer in said hopper;
(e) recompressing said gas from said separator;
(f) returning all of said recompressed gas from said separator to the first zone of one of said reactors; and
(g) supplying fresh gas only to the first zone of the other of said reactors.

24. Process for the polymerization or copolymerization of ethylene in the presence of a catalyst in two reactors arranged in parallel, each of them comprising two or more zones, at a pressure of 300 to 2,500 bars and at a temperature of 150° to 350° C., comprising:
(a) passing reaction mixtures comprising gas and polymer from said two reactors into a single separator at a pressure of 50 to 500 bars;
(b) separating said polymer from said gas in said separator;
(c) passing said polymer from said separator to a hopper at a pressure of 1 to 20 bars;
(d) removing the major part of the gas remaining dissolved in said polymer in said hopper;
(e) recompressing said gas from said separator;
(f) returning said recompressed gas only to the first zone of at least one of said reactors; and
(g) supplying gas to a zone other than the first zone of at least one of said reactors.

* * * * *